United States Patent
Mathan et al.

(10) Patent No.: US 11,656,634 B2
(45) Date of Patent: May 23, 2023

(54) APPARATUS AND METHOD FOR PROVIDING ENHANCED AUTOPILOT MODE AWARENESS FOR A PILOT OF AN AIRCRAFT

(71) Applicant: HONEYWELL INTERNATIONAL INC., Morris Plains, NJ (US)

(72) Inventors: Santosh Mathan, Seattle, WA (US); Diblik Vasco, Albuquerque, NM (US); Ondrej Klusacek, Ochoz u Brna (CZ); Jonathan Matthew Wong, Albuquerque, NM (US); Mark Peurifoy, Rio Rancho, NM (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 447 days.

(21) Appl. No.: 15/907,893

(22) Filed: Feb. 28, 2018

(65) Prior Publication Data

US 2019/0265731 A1  Aug. 29, 2019

(51) Int. Cl.
*G05D 1/08* (2006.01)
*B64D 43/00* (2006.01)
*G05D 1/04* (2006.01)
*G01C 23/00* (2006.01)
*G05D 1/10* (2006.01)

(52) U.S. Cl.
CPC .......... *G05D 1/0816* (2013.01); *B64D 43/00* (2013.01); *G01C 23/005* (2013.01); *G05D 1/042* (2013.01); *G05D 1/101* (2013.01)

(58) Field of Classification Search
CPC ...... G05D 1/0816; G05D 1/101; G05D 1/042; G01C 23/005; G01C 21/00; B64D 43/00
See application file for complete search history.

(56) References Cited

U.S. PATENT DOCUMENTS

| | | | |
|---|---|---|---|
| 5,714,948 A * | 2/1998 | Farmakis | G08G 1/205 340/961 |
| 6,285,298 B1 * | 9/2001 | Gordon | G05B 9/03 340/945 |
| 6,405,107 B1 * | 6/2002 | Derman | G01C 21/005 340/3.5 |
| 6,690,299 B1 | 2/2004 | Suiter | |
| 7,188,007 B2 | 3/2007 | Boorman et al. | |
| 9,116,524 B1 * | 8/2015 | Barker | G01S 19/15 |
| 9,620,021 B1 | 4/2017 | Barber | |
| 2003/0098773 A1 * | 5/2003 | Chakravarty | H04B 7/18508 340/3.1 |
| 2003/0229426 A1 | 12/2003 | Griffin, III et al. | |
| 2011/0118908 A1 * | 5/2011 | Boorman | G08G 5/0021 701/14 |

(Continued)

*Primary Examiner* — Donald J Wallace
(74) *Attorney, Agent, or Firm* — Lorenz & Kopf, LLP

(57) ABSTRACT

Methods and apparatus are provided for providing enhanced autopilot mode awareness for a pilot of an aircraft. The apparatus comprises an autopilot control interface that allows the pilot to activate an operational mode of an autopilot system for the aircraft and to set aviation function parameters of the autopilot system. An autopilot status interface is included that displays the operational mode of the autopilot system and a current status of the aviation function parameters that are controlled by the autopilot system, and an indicator of anticipated actions by the autopilot system to control the aviation function parameters.

20 Claims, 3 Drawing Sheets

(56) References Cited

U.S. PATENT DOCUMENTS

| | | | |
|---|---|---|---|
| 2012/0078450 A1* | 3/2012 | Marche | G05D 1/0607 |
| | | | 701/6 |
| 2013/0013133 A1* | 1/2013 | Walter | G08G 5/0021 |
| | | | 701/11 |
| 2013/0231804 A1 | 9/2013 | Servantie et al. | |
| 2014/0371957 A1* | 12/2014 | Riedinger | B64D 43/00 |
| | | | 701/3 |
| 2015/0094899 A1* | 4/2015 | Hackenberg | B60W 50/082 |
| | | | 701/23 |
| 2015/0120102 A1* | 4/2015 | Hosokawa | G01C 21/203 |
| | | | 701/21 |
| 2015/0261379 A1* | 9/2015 | Kneuper | G01C 23/00 |
| | | | 345/173 |
| 2016/0217697 A1* | 7/2016 | Huber | G08G 5/0069 |
| 2016/0264254 A1 | 9/2016 | Jajur et al. | |

\* cited by examiner

APPARATUS AND METHOD FOR PROVIDING ENHANCED AUTOPILOT MODE AWARENESS FOR A PILOT OF AN AIRCRAFT

TECHNICAL FIELD

The present invention generally relates to equipment for aircraft operations, and more particularly relates to an apparatus and method for providing enhanced autopilot mode awareness for a pilot of an aircraft.

BACKGROUND

Various studies and surveys of flight crews use of autopilot systems note that pilots routinely encountered so-called automation surprises. Automation surprises are situations that prompt pilots to ask about the autopilot system: "What is it doing?"; "Why is it doing that?"; and "What will it do next?". These concerns associated with automation surprises are of particular concern in general aviation contexts where single pilot operations, and lower experience levels compound the situation. Hence, there is a need for an autopilot system that not only provides information allowing pilots to anticipate the effects of various autopilot modes, but also to see the targets being held by an autopilot system in operation.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An apparatus is provided for providing enhanced autopilot mode awareness for a pilot of an aircraft. The apparatus comprises: an autopilot control interface that allows the pilot to activate an operational mode of an autopilot system for the aircraft and to set aviation function parameters of the autopilot system; and an autopilot status interface that displays, the operational mode of the autopilot system, a current status of the aviation function parameters that are controlled by the autopilot system, and an indicator of anticipated actions by the autopilot system to control the aviation function parameters.

A method is provided for providing enhanced autopilot mode awareness for a pilot of an aircraft. The method comprises: activating an autopilot system for the aircraft using an autopilot control interface that allows the pilot to activate an operational mode for the autopilot system; setting an aviation function parameter target for the autopilot system with the autopilot control interface; displaying, with an autopilot status interface, the operational mode of the autopilot system, a preview of the aviation function parameter target, a current status of the aviation function parameter target that is controlled by the autopilot system, an indicator of anticipated actions by the autopilot system to achieve the aviation function parameter target, and supplemental cues showing progress toward achieving the aviation function parameter target.

Furthermore, other desirable features and characteristics of the apparatus and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An apparatus for providing enhanced autopilot mode awareness for a pilot of an aircraft has been developed. The apparatus has an autopilot control interface that allows the pilot to place the autopilot system in an operational mode and set aviation function parameters for the aircraft. The apparatus also includes an autopilot status interface that displays the operational mode of the autopilot system, the current status of the aviation function parameters that are being controlled by the autopilot system and an indicator of the anticipated actions by the autopilot system to control the aircraft in accordance with the aviation function parameters.

The autopilot display allows the pilot to preview targets that will be acquired and held by the autopilot system should a given mode be engaged. The display will provide supplemental cues in the form of text, icons, aural signals, or other cues to make anticipated aircraft behavior clear to the pilot prior to mode engagement. Once a mode is engaged, the autopilot would show any active aircraft parameters being acquired and or held. Supplemental cues will show progress towards the acquisition of the target by the autopilot system.

Figure 1:
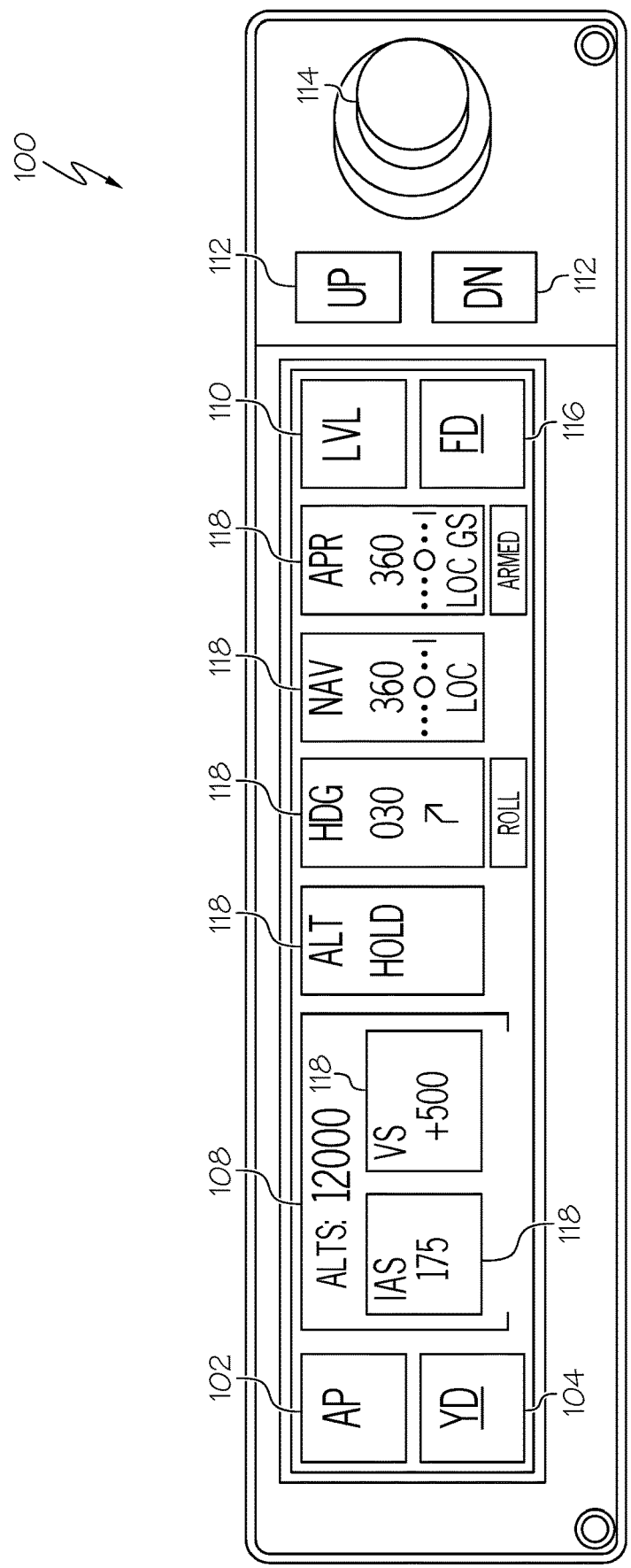
FIG. 1 shows a diagram of an autopilot interface device in accordance with one embodiment.

Turning now to FIG. 1, a diagram is shown of an autopilot interface device 100 in accordance with one embodiment. The autopilot interface 100 is a set of hard and soft controls on a controller unit to engage and disengage general functions. The buttons include: an autopilot button (AP) 102 which engages and disengages the autopilot system for the aircraft; and a yaw damper (YD) button 104 that engages and disengages the yaw damper for the aircraft. When either of these buttons is engaged, the display is illuminated as well as the abbreviation is noted with an underscore indicator as shown on the YD display button 104. Also shown is the altitude selection display 108. This display shows the and altitude target selection (ALTS) display. In this example, the altitude target for the aircraft is shown as 12,000 feet. A level control button (LVL) 110 is used to place the aircraft in a 0 bank and level pitch attitude. Additionally, a flight director button (FD) 116 is used to engage and disengage flight director guidance. Also shown are two "up/down" buttons 112 that control the vertical speed and airspeed inputs for climbs and descents. An altitude selector knob 114 is a dual concentric knob used to adjust the altitude target reference. Finally, 6 separate mode buttons 118 are shown. These mode buttons include: indicated airspeed hold (IAS); vertical speed hold (VS); altitude hold (ALT); heading select (HDG); navigation (NAV); and approach (APR). Each of these modes has indicators of the status listed below the display. In this example, the HDG mode indicates "roll" while the APR mode is "armed".

Figure 2:
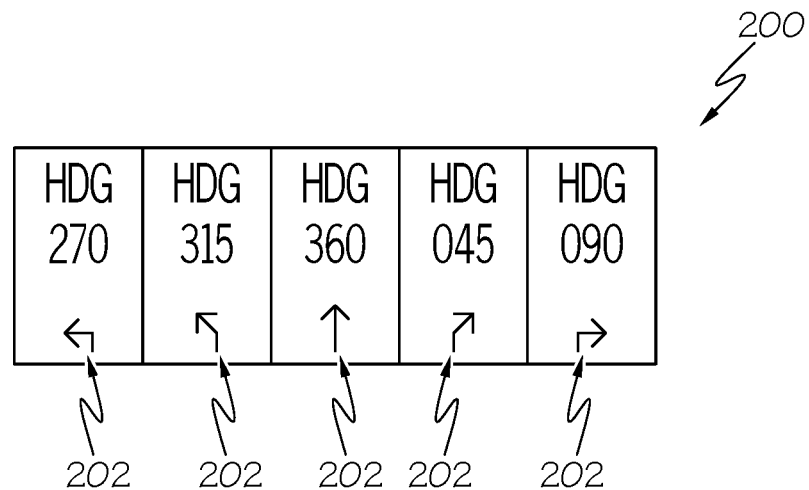
FIG. 2 shows a diagram of a detail view of the heading display of an autopilot interface device in accordance with an embodiment.

Turning now to FIG. 2, a diagram is shown of a various detail views of the heading display 200 of an autopilot interface device in accordance with one embodiment. Specifically, the diagram shows 5 alternative displays 202 for use with the HDG display. The displays show a heading value (270, 315, 360, 045 and 090) in addition to a directional arrow shown at the bottom of the HDG display. These alternatives 202 indicate a directional change of left, half-left, straight ahead, half-right and right. The directional change is based on the difference between the selected and actual heading of the aircraft.

Figure 3:
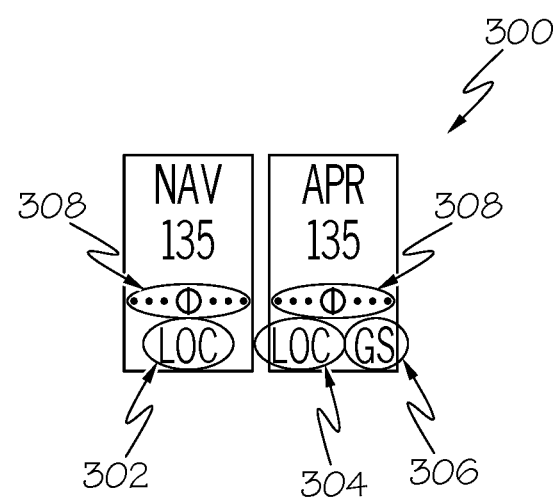
FIG. 3 shows a diagram of a detail view of a navigation display and the approach display of autopilot interface device in accordance with an embodiment.

Turning now to FIG. 3, a diagram is shown of detail views of the NAV and APR displays 300 of an autopilot interface device in accordance with one embodiment. These displays each include a deviation annunciation indicator 308. The deviation indicators display the deviations between the selected and actual parameters. Also included or source indicators of the navigation data. For the NAV display, the source indicator 302 shows "LOC" which indicates a radio source for the navigation display. An alternative indicator would be "GS" which indicates a global positioning system source for the navigation display. For the APR display, the source indicators are "LOC" 304 and "GS" 306. The APR display uses to source indicators to indicate lateral and vertical parameters respectively.

In these examples, the autopilot system is shown to control such aviation function parameters as flight direction, pitch and roll of the aircraft, and altitude selection. However, it should be understood that other flight parameters for the aircraft may be controlled by the autopilot system. For example, vertical flight parameters such as a pitch angle function that maintains the pitch attitude of the aircraft may be included. Additionally, an altitude hold function that maintains a present altitude of the aircraft and an airspeed hold function that maintains a specific airspeed for the aircraft may be included. Lateral flight parameters may also be controlled in other embodiments including a heading hold function that maintains a specific heading of the aircraft and a navigation hold function that maintains a specific navigation point for the aircraft.

Figure 4:
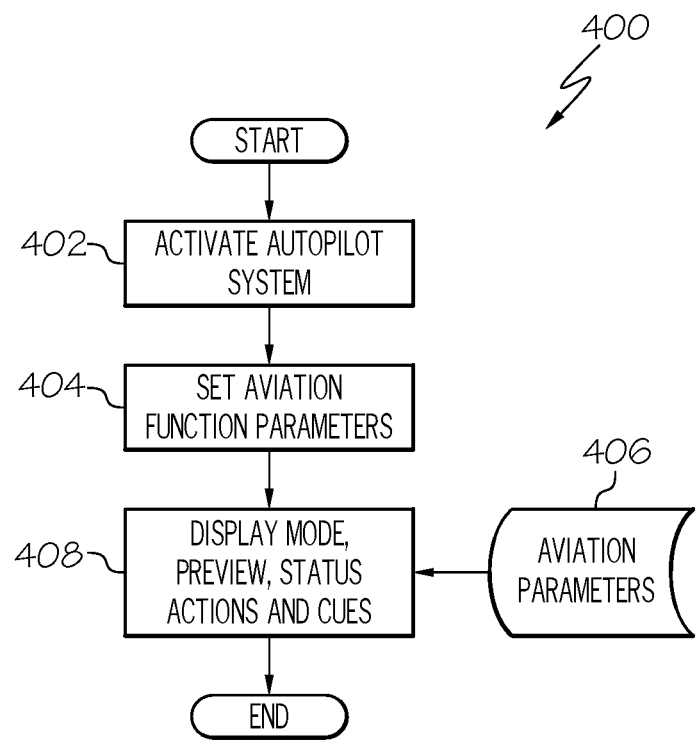
FIG. 4 shows a flowchart of a method for providing enhanced autopilot mode awareness for a pilot of an aircraft in accordance with one embodiment.

Turning now to FIG. 4, a flowchart 400 of a method for providing enhanced autopilot mode awareness for a pilot of an aircraft in accordance with one embodiment. First, an autopilot system for the aircraft is activated using an autopilot control interface that allows the pilot to activate an operational mode for the system 402. Various aviation function parameter targets for the autopilot system are set using the autopilot control interface 404. An autopilot status interface then displays the operational mode of the autopilot system, a preview of any aviation function parameter targets, the current status of the aviation function parameter targets controlled by the autopilot system, indicators of anticipated actions by the autopilot system to achieve the aviation function parameter target, and supplemental cues showing progress toward achieving the aviation function parameter target 408. The supplemental cues may be in the form of text, icons, aural, or other suitable formats. The aviation function parameters 406 are provided from the corresponding systems of the aircraft so that the autopilot status interface may also display an indicator of anticipated actions by the autopilot system to control the aviation function parameters.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for providing enhanced autopilot mode awareness for a pilot of an aircraft, comprising:
   an autopilot control interface that allows the pilot to activate an operational mode of an autopilot system for the aircraft and to set selected aviation function parameters of the autopilot system; and
   an autopilot status interface that is configured to display:
      the operational mode of the autopilot system,
      a current status of the selected aviation function parameters that are controlled by the autopilot system, where the current status is shown on a navigation (NAV) display,
      any deviation between a target value of the selected aviation function parameters and an actual value of the selected aviation function parameters as shown on the NAV display, where the amount of deviation between the target value of the selected aviation function parameters and an actual value of the selected aviation function parameter is displayed on a deviation annunciation indicator located on the autopilot status interface,
      a source indicator for navigation data shown on the NAV display, and
      an indicator of anticipated changes to the heading, pitch and roll of the aircraft by the autopilot system to achieve the target value of the selected aviation function parameters, where the anticipated changes to the heading, pitch and roll of the aircraft by the autopilot system include supplemental cues that display the progress towards acquisition of the target value of the selected aviation function parameter.

2. The apparatus of claim 1, further comprising:
   a yaw damper interface that controls aircraft stability with automated turn coordination.

3. The apparatus of claim 2, where the autopilot control interface and the yaw damper interface are activated simultaneously.

4. The apparatus of claim 1, where the autopilot control interface allows the pilot to activate a non-operational mode of the autopilot system for the aircraft that provides operational guidance to the pilot.

5. The apparatus of claim 1, where the aviation function parameters of the autopilot system comprise flight direction parameters.

6. The apparatus of claim 5, where the flight direction parameters comprise pitch and roll parameters for the aircraft.

7. The apparatus of claim 1, where the aviation function parameters of the autopilot system comprise an altitude preselection function for the aircraft.

8. The apparatus of claim 1, where the aviation function parameters of the autopilot system comprise vertical flight parameters of the aircraft.

9. The apparatus of claim 8, where the vertical flight parameters comprise a pitch angle function for the aircraft.

10. The apparatus of claim 9, where the pitch angle function for the aircraft comprises a default vertical mode that maintains a pitch attitude of the aircraft.

11. The apparatus of claim 8, where the vertical flight parameters comprise an altitude hold function that maintains a present altitude of the aircraft.

12. The apparatus of claim 8, where the vertical flight parameters comprise an airspeed hold function that maintains a specific airspeed of the aircraft.

13. The apparatus of claim 8, where the vertical flight parameters comprise a vertical speed hold function that maintains a specific vertical speed of the aircraft.

14. The apparatus of claim 1, where the aviation function parameters of the autopilot system comprise lateral flight parameters of the aircraft.

15. The apparatus of claim 14, where the lateral flight parameters comprise a roll function of the aircraft.

16. The apparatus of claim 14, where the lateral flight parameters comprise a heading hold function that maintains a specific heading of the aircraft.

17. The apparatus of claim 14, where the lateral flight parameters comprise a navigation hold function that maintains a specific navigation point of the aircraft.

18. A method for providing enhanced autopilot mode awareness for a pilot of an aircraft, comprising:
   activating an autopilot system for the aircraft using an autopilot control interface that allows the pilot to activate an operational mode for the autopilot system;
   setting a target value for a selected aviation function parameter of the autopilot system with the autopilot control interface; and
   displaying, with an autopilot status interface,
      the operational mode of the autopilot system,
      a preview of the target value for the selected aviation function parameter,
      a current status of the target value for the selected aviation function parameter target that is controlled by the autopilot system, where the current status is shown on a navigation (NAV) display, an indicator of anticipated changes to the heading, pitch and roll of the aircraft by the autopilot system to achieve the target value for the selected aviation function parameter target as shown on the NAV display, where the anticipated changes to the heading, pitch and roll of the aircraft by the autopilot system include progress towards acquisition of the target value of the selected aviation function parameter, any deviation between the target value of the selected aviation function parameter target and an actual value of the selected aviation function parameter, where the amount of deviation between the target value of the selected aviation function parameters and an actual value of the selected aviation function parameter is displayed on a deviation annunciation indicator located on the autopilot status interface, a source for navigation data shown on the NAV display, and supplemental cues showing progress toward achieving the target value of the selected aviation function parameter target.

19. The method of claim 18, where the supplemental cues are a textual message.

20. The method of claim 18, where the supplemental cues are a visual icon.

* * * * *